(12) United States Patent
Ieradi (10) Patent No.: US 12,077,026 B2
(45) Date of Patent: Sep. 3, 2024

(54) B-TRAIN ELECTRIC TRUCK

(71) Applicant: Giuseppe Ieradi, Maple (CA)

(72) Inventor: Giuseppe Ieradi, Maple (CA)

(73) Assignee: Giuseppe Ieradi, Maple (CA)

( * ) Notice: Subject to any disclaimer, the term of this patent is extended or adjusted under 35 U.S.C. 154(b) by 929 days.

(21) Appl. No.: 16/741,967

(22) Filed: Jan. 14, 2020

(65) Prior Publication Data

US 2021/0213792 A1 Jul. 15, 2021

(51) Int. Cl.
*B60D 1/44* (2006.01)
*B60D 1/62* (2006.01)

(52) U.S. Cl.
CPC ........ *B60D 1/44* (2013.01); *B60D 1/62* (2013.01)

(58) Field of Classification Search
CPC .......... B60D 1/246; B60D 1/247; B60D 1/42; B60D 1/44; B60D 1/481; B60D 1/62; B62D 53/067; B62D 53/068; B60P 1/6418; B60P 1/6427
See application file for complete search history.

(56) References Cited

U.S. PATENT DOCUMENTS

| | | | |
|---|---|---|---|
| 4,240,647 A | 12/1980 | Milburn | |
| 4,589,670 A * | 5/1986 | Sweetin | B62D 53/0864 280/490.1 |
| 4,611,821 A | 9/1986 | Jeanson et al. | |
| 6,231,065 B1 * | 5/2001 | Brown | B60D 1/155 180/7.1 |
| 8,262,118 B2 * | 9/2012 | Pipe | B62D 53/068 280/441 |
| 8,465,047 B2 * | 6/2013 | Groeneweg | E01F 15/14 404/6 |
| 8,678,420 B2 * | 3/2014 | Gallego | B60D 1/62 280/446.1 |
| 2016/0137238 A1 * | 5/2016 | Faymonville | B62D 53/067 280/423.1 |
| 2019/0385461 A1 | 12/2019 | Blomstrand et al. | |

OTHER PUBLICATIONS

International Search Report and Written Opinion issued in International Application No. PCT/CA2021/050035 dated Apr. 30, 2021.

* cited by examiner

*Primary Examiner* — Kevin Hurley
*Assistant Examiner* — Hosam Shabara
(74) *Attorney, Agent, or Firm* — NORTON ROSE FULBRIGHT CANADA LLP (57) ABSTRACT

A system for actuating a telescopic actuator that is mechanically connected to a back end of a first trailer of a truck and a front end of a second trailer of the truck is disclosed herein. The system has one or more data processors; and non-transitory machine-readable memory storing instructions executable by the one or more data processors. The instructions when executed by the one or more data processor is configured to determine, using data indicative of a geographical location of the truck, an initiation time at which to initiate actuation of the telescopic actuator. The instructions when executed by the one or more data processors is then configured to automatically initiate actuation of the telescopic actuator at the initiation time.

7 Claims, 8 Drawing Sheets

B-TRAIN ELECTRIC TRUCK

TECHNICAL FIELD

The disclosure relates generally to trucks, and more particularly to electric dump trucks having multiple trailers to carry large loads.

BACKGROUND

A dump truck that includes multiple trailers and a diesel engine emits a significant amount of carbon dioxide and other greenhouse gases when transporting material. Sometimes, a site where construction material is loaded into trailers of the truck can be at a great distance from an offloading site. This requires the truck to travel far distances thereby burning fuel and emitting carbon dioxide and other greenhouse gases into the atmosphere. Further, federal laws define weight limits between axles of a vehicle on bridges and interstates. Due to these weight limits, trucks sometimes have to carry a reduced load to comply with these federal laws. Therefore to transport all the materials necessary to a construction site, a dump truck may have to make multiple trips or a number of dump trucks may be need to transport material from the loading site to the offloading site.

Dump trucks rely on mechanical differential units on the rear axles to allow wheels to rotate at different speeds for easy turning. An equal torque is applied to both wheels. However, during certain conditions, for instance the truck is stuck in mud, the differential unit will directly power the wheel with least resistance which may pose as a problem. To deal with this problem, locks may be applied to mechanical differential units to ensure that both wheels are travelling at the same rotational speed. The torque applied to each wheel may be different and may assist in getting the truck out of the mud in the example described above. However, turning a truck with a locked differential unit may cause scuffing. Heavy duty trucks have differential locks that can be applied at low speed.

Improvements are desirable.

SUMMARY

In one aspect, the disclosure describes a system for actuating a telescopic actuator that is mechanically connected to a back end of a first trailer of a truck and a front end of a second trailer of the truck. The system comprises one or more data processors; and non-transitory machine-readable memory storing instructions executable by the one or more data processors and configured to cause the one or more data processors to: determine, using data indicative of a geographical location of the truck, an initiation time at which to initiate actuation of the telescopic actuator; and automatically initiate actuation of the telescopic actuator at the initiation time.

In an embodiment, the instructions are configured to receive the data indicative of the geographical location of the truck from a global positioning system receiver within the truck.

In another embodiment, automatically initiating actuation of the telescopic actuator includes moving an inner section of the telescopic actuator relative to an outer section of the telescopic actuator. Automatically initiating actuation of the telescopic actuator at the initiation time may also include using a hydraulic system for providing the movement of the inner section relative to the outer section.

In another embodiment, when the geographical location of the truck is proximate a location of a bridge having a weight limit, automatically initiating actuation of the telescopic actuator includes outward movement of the inner section relative to the outer section to increase a distance between the back end of the first trailer and the front end of the second trailer.

In another embodiment, when the geographical location of the truck is distant any bridges having gross weight limits, automatically initiating actuation of the telescopic actuator includes inward movement of the inner section relative to the outer section to reduce a distance between the back end of the first trailer and the front end of the second trailer.

In another embodiment, the outward movement of the inner section relative to the outer section enables the truck to be within the weight limit of the bridge.

Embodiments may include combinations of the above features.

In another aspect, the disclosure describes a trailer of a dump truck defining an interior space, the trailer comprising: a floor; and a battery compartment located within the space that is defined by at least the floor of the trailer and two walls that each extend along a length of the floor, wherein: a first wall of the two walls extends from a first side of the floor to an intersection between the first wall and the second wall; a second wall of the two walls extends from a second side of the floor that is opposite the first side of the floor to the intersection between the first wall and the second wall; the first wall and the second wall being at an angle relative to the floor; and the intersection between the first wall and the second wall being at a height greater than a height of the floor.

In an embodiment of the trailer, the floor, the first wall and the second wall define an aperture for selectably receiving one or more battery modules.

In another embodiment, the trailer further comprises: two pivotable doors that form side walls of the trailer.

In another embodiment of the trailer, a first end of each of the pivotable doors is mechanically connected to a rim of a roof of the trailer. A second end of each of the pivotable doors may be removably latched to a respective striker plate to define the first side of the floor and the second side of the floor.

In another embodiment, a truck comprises the trailer of the trailers describe above. The truck may further comprise an electrical differential steering system that includes: one or more data processors; and non-transitory machine-readable memory storing instructions executable by the one or more data processors and configured to cause the one or more data processors to: receive a steering signal indicative of a position of a steering wheel of the truck; receive a sensor signal indicative of a rotational speed of an output shaft of an electric motor coupled to a wheel of the truck; and using at least the steering signal and the sensor signal, determine an amount of power to supply to the electric motor.

In an embodiment of the truck, the electric motor is electrically connected to one or more battery modules located in the battery compartment of the trailer.

Embodiments may include combinations of the above features.

In a further aspect, the disclosure describes an apparatus for manipulating a distance between trailers of a truck, the actuator comprising: an inner section telescopingly connected to an outer section; an actuation system comprising: a hydraulic fluid reservoir; a piston housing defining a chamber in fluid communication with the hydraulic fluid reservoir, the housing receiving a piston slidably engaged with an inner surface of the housing; and a piston rod connected to the piston; wherein the piston housing and piston rod are each respectively configured to be coupled to opposing truck trailers, and wherein the piston housing and the piston rod are defined by the inner section and the outer section.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following description discloses systems that allow actuation of a telescopic actuator mechanically connected between trailers of a truck based on data indicative of a current location of the truck. One system is disclosed herein that is configured to cause an inner section of a telescopic actuator to be extended relative to an outer section of the telescopic actuator to enable a truck to be within the weight limit of a bridge when approaching the bridge.

The description further discloses a trailer of an electric dump truck defining an interior space and a battery compartment located within the space. Another system is disclosed herein that controls a power supplied from battery modules located in the battery compartment to electronic motors coupled to wheels of the truck. The system employed in the truck may improve the manoeuverability of the truck in comparison to conventional trucks with multiple trailers. The truck may include a large number of drive axles to improve manoeuverability and to increase torque of the truck. The increased torque may allow truck to carry large loads and allow truck to climb steep slopes.

Although terms such as "maximize" and "minimize" and "optimize" may be used in the present disclosure, it should be understood that such term may be used to refer to improvements, tuning and refinements which may not be strictly limited to maximal, minimal or optimal.

The term "connected" or "coupled to" may include both direct coupling (in which two elements that are coupled to each other contact each other) and indirect coupling (in which at least one additional element is located between the two elements).

The term "substantially" as used herein may be applied to modify any quantitative representation which could permissibly vary without resulting in a change in the basic function to which it is related.

Figure 1:
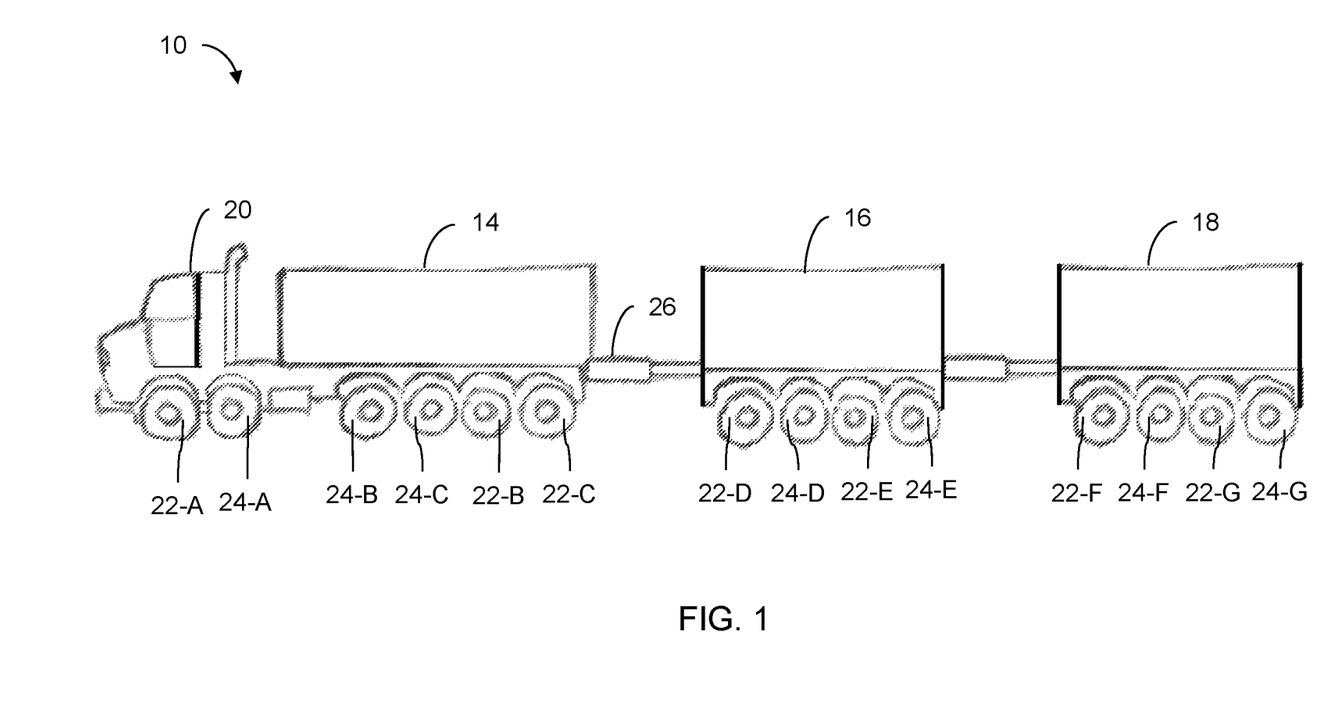
FIG. 1 shows a side view of an exemplary truck that includes a tractor unit and multiple trailers connected to the tractor unit.

FIG. 1 is a side view of an exemplary truck 10 including tractor unit 20 and trailers 14, 16 and 18. Truck 10 may include system 12 for automatically actuating actuation system 31 that may form part of telescopic actuator 26. Telescopic actuator 26 may be mechanically connected to a back end of trailer 14 and a front end of trailer 16. It should be understood that truck 10 may use system 12 or another system for automatically actuating an actuation system that may form part of telescopic actuator that is mechanically connected to a back end of trailer 16 and a front of trailer 18. As depicted, truck 10 may have a plurality of pairs of coaxial wheels that are each mounted to axles of trailers 14, 16, or 18, or tractor unit 20.

Figure 4:
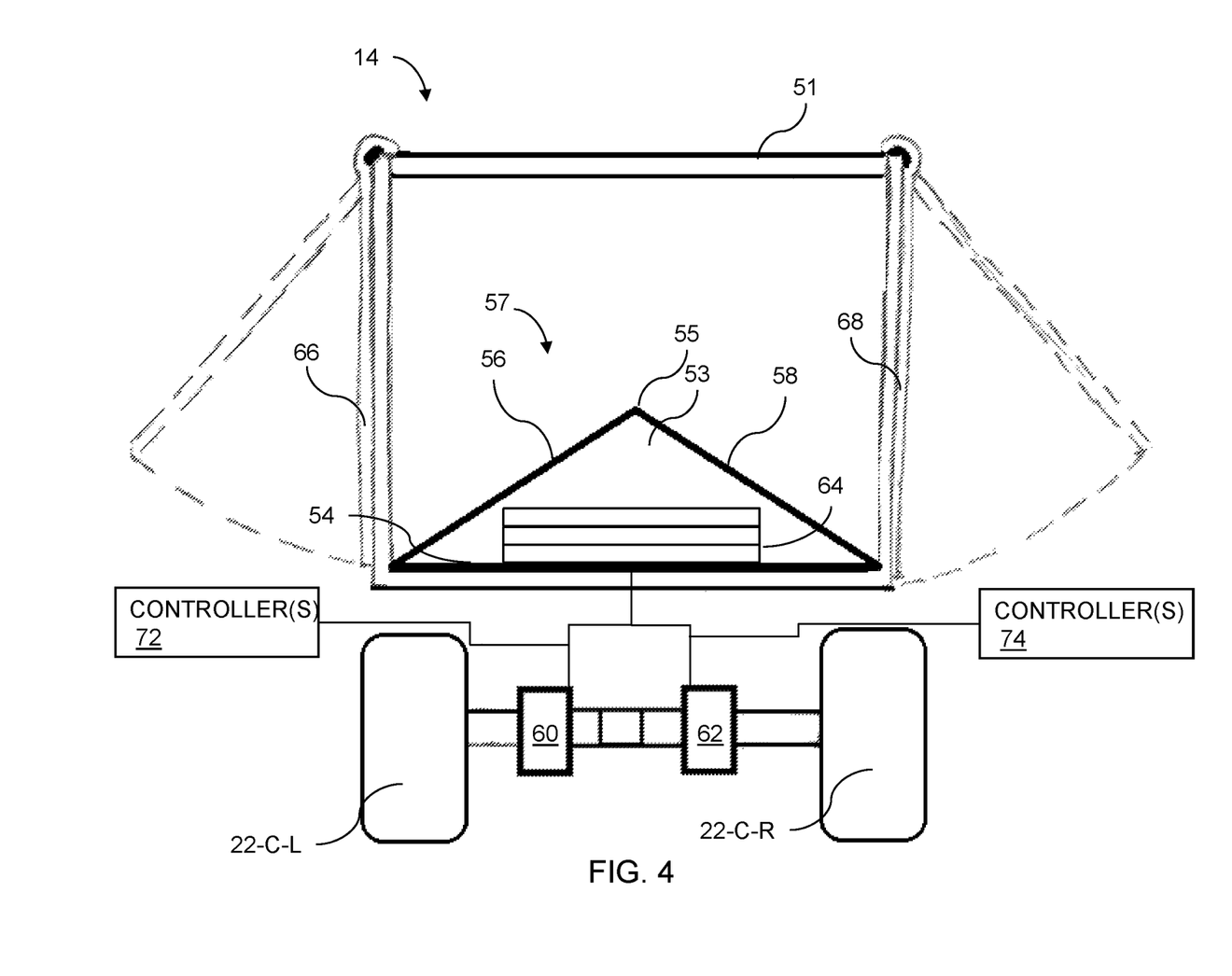
FIG. 4 shows a back view of a trailer a truck according to a first embodiment of the invention.
Figure 5:
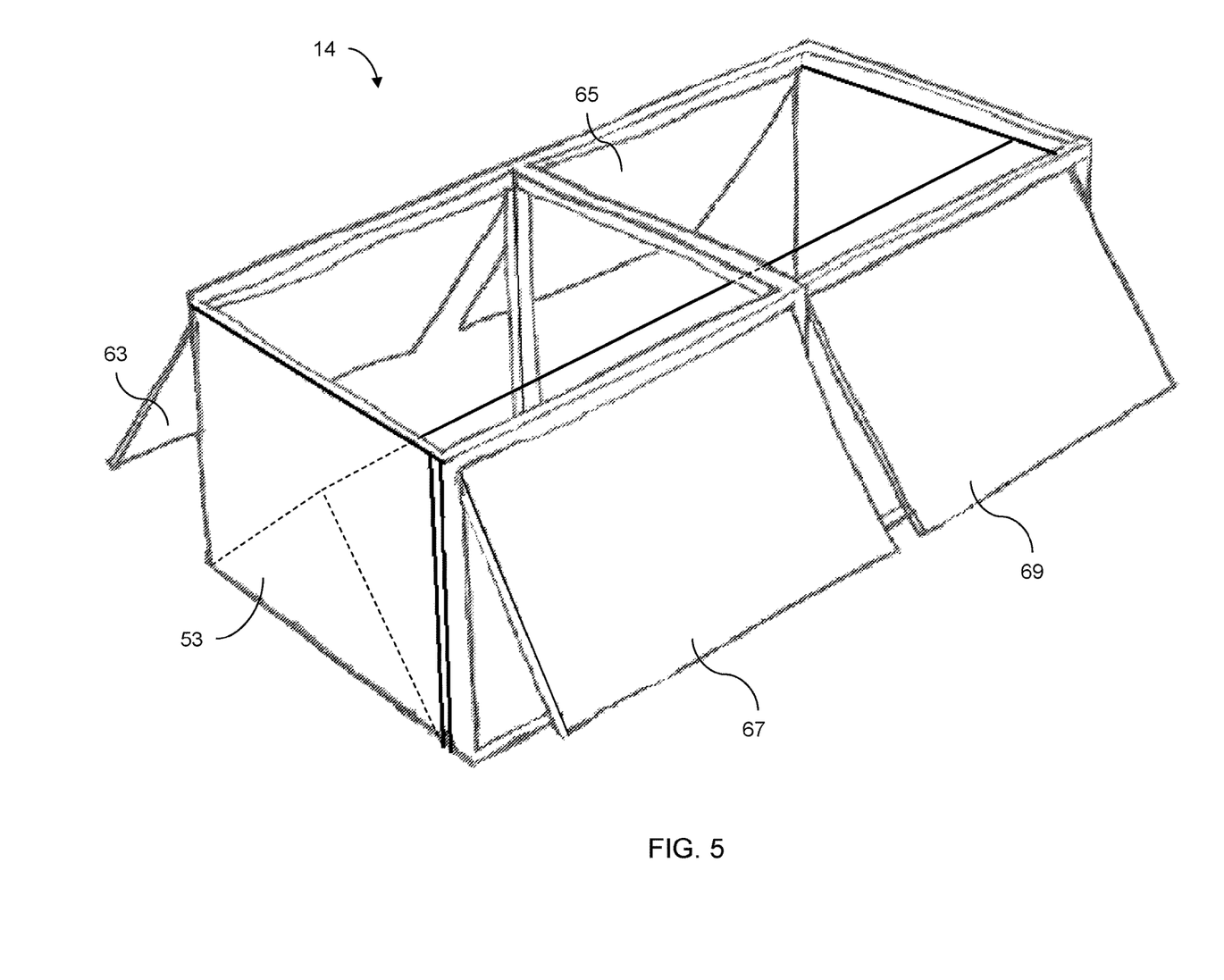
FIG. 5 shows a perspective view of a portion of a trailer that has two pivotable doors on each side of the trailer to unload material.

Truck 10 may further include system 70 (As shown in FIG. 5) that is configured to provide electronic differential steering to truck 10. Some of the axles of truck 10 may be directly coupled to one or more electric motors (As shown in FIG. 4). In FIG. 1, each of the wheels of coaxial wheel pairs 22-A to 22-G may be electrically coupled to an electric motor. In some embodiments, the number of coaxial wheel pairs of coaxial wheel pairs 22-A to 22-G that are being supplied power from coupled electric motors may depend on a driving condition of truck 10. For example, in a case that truck 10 is driving up a hill, all of coaxial wheel pairs 22-A to 22-G may be supplied power from coupled electric motors to provide the necessary torque to travel up the incline. While in a case that truck 10 is driving on a flat highway, only coaxial wheel pairs 22-A, 22-B, 22-D and 22-F may be supplied power from coupled electric motors since less torque is required to move the vehicle. In some embodiments, truck 10 may have more driving axles than a conventional truck of a similar size to improve manoeuverability and increase torque of truck 10.

Other axles of truck 10 may be non-driving axles that are not directly coupled to electric motors. In FIG. 1, each of the wheels of coaxial wheel pairs 24-A to 24-G may be non-driving axles.

Although FIG. 1 depicts truck 10 having 14 pairs of coaxial wheels, it should be understood that truck 10 may have a different number of pairs of coaxial wheels. It should also be understood that the pairs of coaxial wheels may be distributed differently on truck 10 (i.e. a different number of wheels on trailers 14, 16, 18 and tractor unit 20). Further, truck 10 may have a different number of trailers (e.g. 2, 4).

Figure 2:
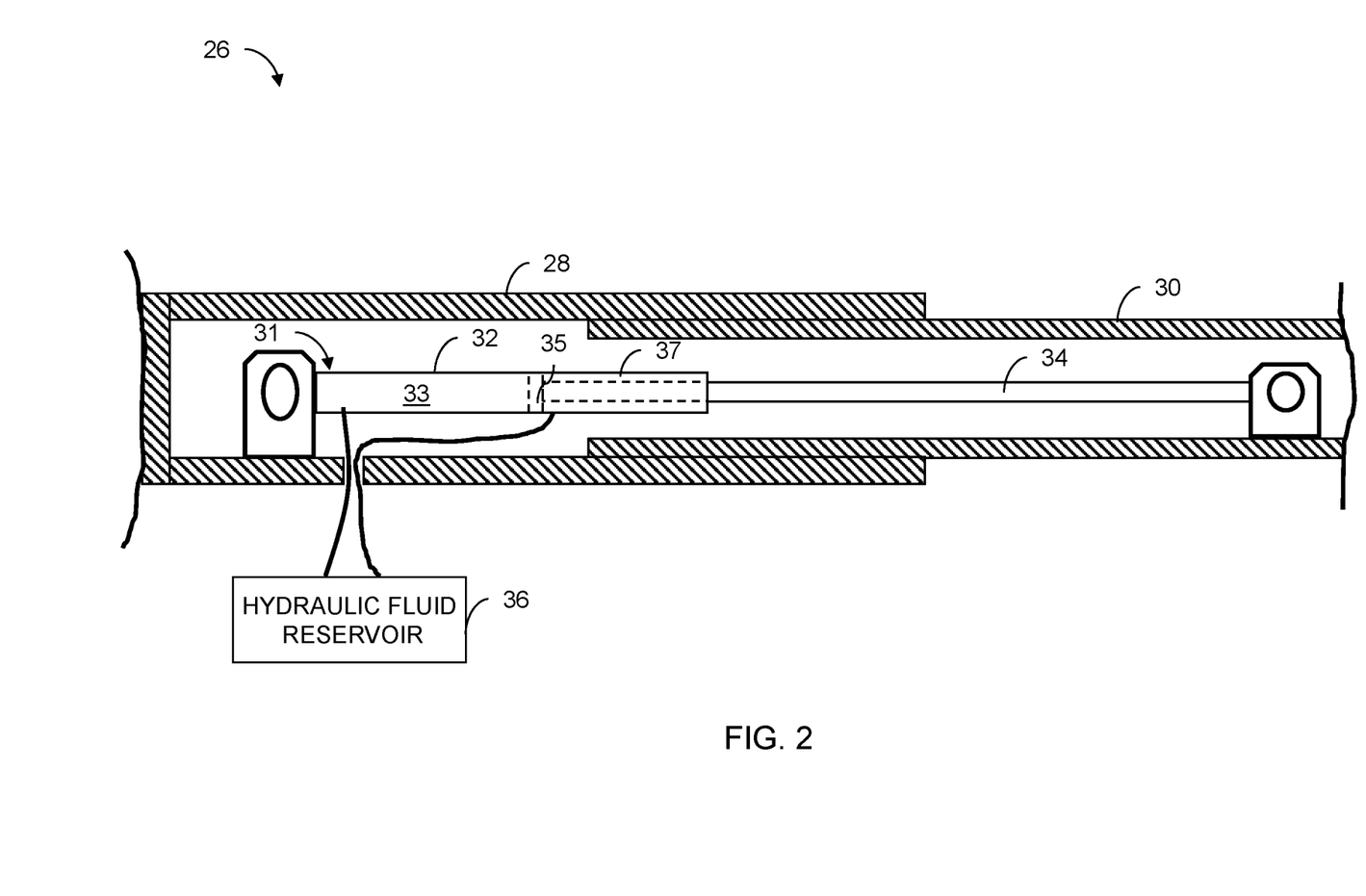
FIG. 2 shows an exemplary actuation system that may form part of a telescopic actuator that is mechanically connected to a back end of a first trailer and a front end of a second trailer.

FIG. 2 shows an exemplary actuation system 31 that may form part of telescopic actuator 26 that is mechanically connected to a back end of trailer 14 and a front end of trailer 16. Telescopic actuator 26 may be fixed at one end to a support structure of trailer 14 and at another end to a drawbar that is fixed to a support structure of trailer 16. Support structure of trailer 14 and/or support structure of trailer 16 may be a hitch for example. In some embodiments, it may be desirable to adjust a distance between trailer 14 and trailer 16 using actuation system 31. For example, a distance between trailer 14 and trailer 16 may be increased to comply with weight limits of a bridge. This concept will be described in further detail below.

As depicted, actuation system 31 is a hydraulic system. Piston housing 32 of the hydraulic system may be fixed to outer section 28 of telescopic actuator 26. Piston rod 34 of the hydraulic system may be fixed to inner section 30 of telescopic actuator 26.

In some embodiments, it may be desirable to move inner section 30 of telescopic actuator 26 relative to outer section 28 of telescopic actuator 26. The movement of inner section 30 relative to outer section 28 may be facilitated by actuation system 31.

Hydraulic fluid may be supplied by hydraulic fluid reservoir 36 to fill chamber 33 defined by a piston housing 32, as a cylinder, and piston head 35. As the volume of hydraulic fluid in chamber 33 increases, the pressure in chamber 33 also increases. The pressure in chamber 33 causes a force to be exerted on piston head 35 causing piston rod 34 to extend outward. In an embodiment, as piston rod 34 extends outwards, inner section 30 is also moved outward relative to outer section 28 since piston rod 34 is fixed to inner section 30. As inner section 30 is moved outward relative to outer section 28, a distance between trailer 14 and trailer 16 is increased. The piston housing 32, which may have a generally cylindrical shape, and piston rod 34 are each respectively configured to be coupled to opposing truck trailers. For example piston rod 34 may be coupled to inner section 30 which is coupled to a truck trailer 16, and piston housing, e.g. cylinder 32, may be coupled to outer section 28 which in coupled to an opposing truck trailer 14.

In some cases, piston rod 34 may be retracted to cause inner section 30 to move inward relative to outer section 28. Hydraulic fluid may be supplied to fill chamber 37 defined by piston housing 32, piston head 35 and piston rod 34 to facilitate the inward movement of inner section 30 relative to outer section 28.

It is understood that other systems other than the hydraulic system described above may be used to adjust a distance between trailer 14 and trailer 16. For example, telescopic actuator may be mechanically coupled to an electric motor that causes movement of inner section 30 relative to outer section 28.

Figure 3:
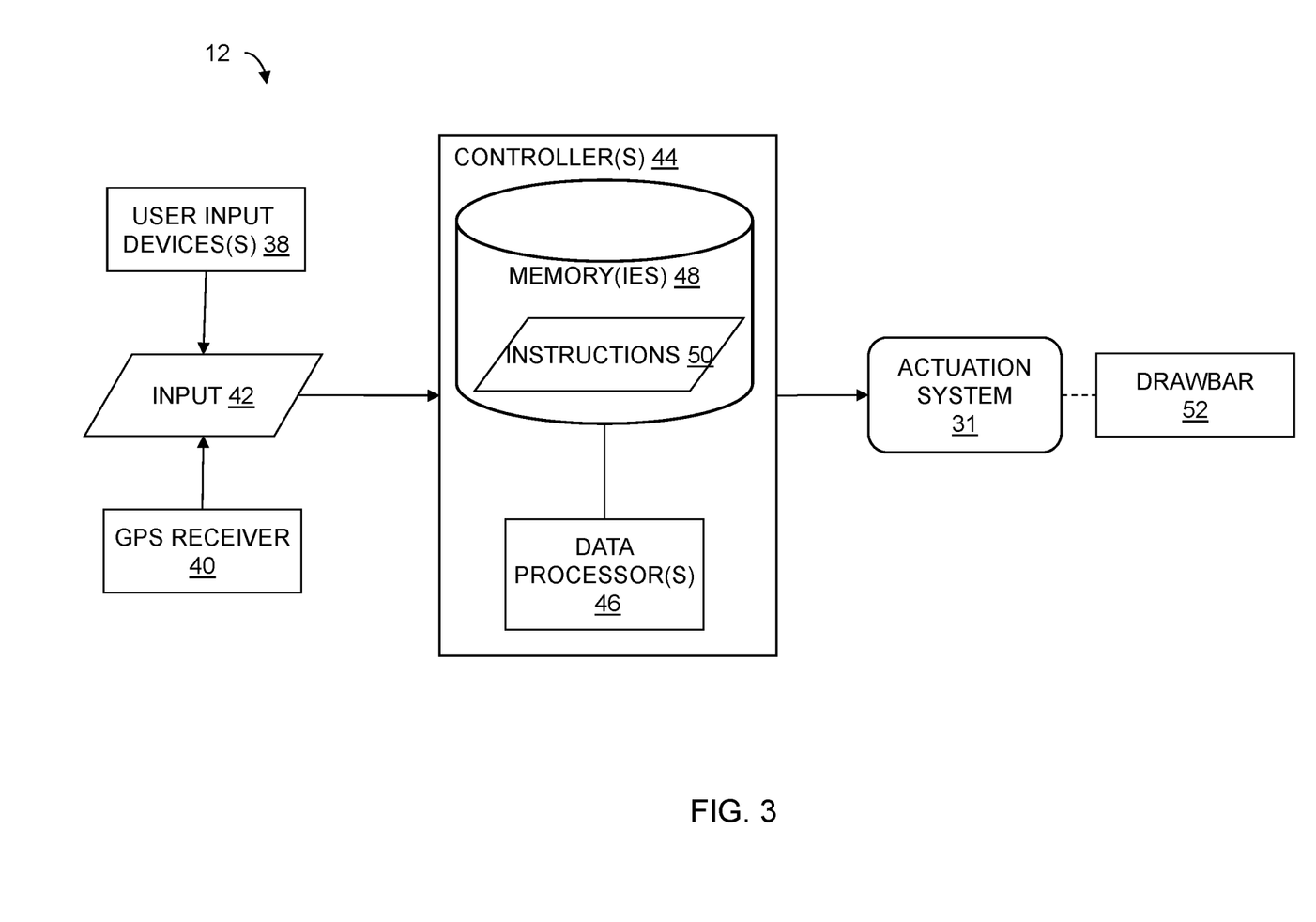
FIG. 3 is a schematic diagram of a system that may be used for actuating a telescopic actuator mechanically connected to a back end of a first trailer and a front end of second trailer.

FIG. 3 is a schematic diagram of system 12 that may be used for actuating telescopic actuator 26 mechanically connected to a back end of trailer 14 and a front end of trailer 16. System 12 may include one or more user input devices 38 (referred herein after in the singular), global position system (GPS) receiver 40, controller 44 and actuator system 31. Drawbar 52 may be mechanically connected to trailer 16.

Controller 44 may be configured to facilitate movement of inner section 30 of telescopic actuator 26 relative to outer section 28 of telescopic actuator 26. Controller 44 may be configured to receive input 42 (i.e. signals) from user input device 38 and/or GPS receiver 40 via one or more communication terminals/ports. Controller 44 may receive input 42 on a substantially continuous basis or intermittently so that the data may be available to controller 44 in real-time. Controller 44 may be located proximate telescopic actuator 26 or may be located in tractor unit 20 for example. Controller 44 may include one or more data processors 46 (referred hereinafter in the singular) and one or more computer-readable memories 48 (referred hereinafter in the singular) storing machine-readable instructions 50 executable by the data processor 46 and configured to cause data processor 46 to generate one or more outputs for causing the execution of steps of the methods described herein.

Data processor 46 may include any suitable device(s) configured to cause a series of steps to be performed by controller 44 so as to implement a computer-implemented process such that instructions 50, when executed by computer 36 or other programmable apparatus, may cause the functions/acts specified in the methods described herein to be executed. Data processor 46 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 48 may include any suitable machine-readable storage medium. Memory 48 may include non-transitory computer readable storage medium such as, for example, but not limited to, an electronic, magnetic, optical, electromagnetic, infrared, or semiconductor system, apparatus, or device, or any suitable combination of the foregoing. Memory 48 may include a suitable combination of any type of computer memory that is located either internally or externally to controller 44. Memory 48 may include any storage means (e.g. devices) suitable for retrievably storing machine-readable instructions 50 executable by data processor 46.

Various aspects of the present disclosure may be embodied as systems, devices, methods and/or computer program products. Accordingly, aspects of the present disclosure may take the form of an entirely hardware embodiment, an entirely software embodiment or an embodiment combining software and hardware aspects. Furthermore, aspects of the present disclosure may take the form of a computer program product embodied in one or more non-transitory computer readable medium (e.g., memory 48) having computer readable program code (e.g., instructions 50) embodied thereon.

Computer program code for carrying out operations for aspects of the present disclosure in accordance with instructions 50 may be written in any combination of one or more programming languages. Such program code may be executed entirely or in part by controller 44 or other data processing device(s). It is understood that, based on the present disclosure, one skilled in the relevant arts could readily write computer program code for implementing the methods disclosed herein.

GPS receiver 40 may be a device configured to receive information from GPS satellites and to determine receiver's 40 geographical position. GPS receiver may also be configured to receive a location of a bridge and weight restriction data of the bridge. GPS receiver 40 may be integrated in controller 44 or coupled to controller 44 to provide data indicative of a geographical location of truck 10, location of a bridge, and/or weight restriction data of the bridge to controller 44. GPS receiver 40 may be located proximate telescopic actuator 26 or in tractor unit 20 of truck 10 for example.

Based on input 42, controller 44 may be configured to generate and transmit an output signal to actuation system 31 via the one or more communication terminals. Controller 44 may be configured to receive data indicative of a geographical location of truck 10 on a continuous basis. Using this data, controller 44 may be configured to determine an initiation time to initiate actuation of telescopic actuator 26. Controller 44 may then be configured to initiate actuation of telescopic actuator 26 at the initiation time. Controller 44 may be configured to generate and transmit an output signal to actuation system 31 at the initiation time. In response to receiving the output signal by actuation system 31, actuation system 31 may be configured to move inner section 30 of telescopic actuator 26 relative to outer section 28 of telescopic actuator 26.

In some embodiments, the initiation time may be at an instance when the geographical location of truck 10 is proximate a location of a bridge having weight limits. The weight limits defined by federal law may outline a maximum weight permitted between certain axles of a vehicle. In a case that truck 10 is not compliant with weight limits of a bridge and truck 10 is approaching the bridge, system 12 may be configured to facilitate outward movement of inner section 30 relative to outer section 28 to enable truck 10 to be within the weight limits of the bridge. Truck 10 may have a length of 85 feet when inner section 30 is fully retracted and may have a length of 100 feet when inner section 30 is fully extended. It is understood that truck 10 may have a different length when inner section 30 is fully retracted and/or when inner section 30 is fully extended.

In some embodiments, data such as government maps defining locations where weight limits are enforced may be stored in memory 48. In other embodiments, controller 44 may be in communication with a remote server that stores data defining the locations where weight limits are enforced.

Controller 44 may further be configured to determine an amount of outward movement of inner section 30 relative to outer section 28 based on a current displacement between inner section 30 and outer section 28, and the weight limits of a vehicle defined under law for the proximate bridge. In some embodiments, the amount of outward movement of inner section 30 relative to outer section 28 may be equal to an amount that would permit truck 10 to be compliant with weight limits of the proximate bridge when inner section 30 is extended by the amount.

When truck 10 has just passed a bridge and there are no other bridges proximate, controller 44 may be configured to generate and transmit an output signal to actuation system 31 to initiate actuation of telescopic actuator 26. In this case, the actuation of telescopic actuator 26 includes inward movement of inner section 30 relative to outer section 28 to decrease a distance between the back end of trailer 16 and the front end of trailer 12. Truck 10 may have improved performance characteristics when a distance between trailers is minimized. Therefore, if truck 10 is not approaching a bridge with weight limits, it may be desirable to have inner section 30 in a fully retracted position (i.e. minimum distance between inner section 30 and outer section 28 allowable).

System 31 described above may permit truck 10 to carry a greater load in comparison to a truck that is unable to adjust a distance between connected trailers. Increasing the load size per trailer may significantly reduce an operating cost for construction projects since the number of trips between a loading site and an offloading site may be reduced due to the increased amount of material that can be accommodated in truck 10. Trucks that are unable to adjust a distance between connected trailers may have to carry a smaller load in trailers in comparison to trailers of truck 10 to comply with federal laws pertaining to weight limits of a vehicle on bridges.

Although system 31 described above describes actuating telescopic actuator 36 based on a proximity to a bridge having weight limits, it should be understood that actuation of the telescopic actuator may be based on a geographical location that has no relation to proximity to a bridge. In some embodiments, the geographical location may be a highway that has weight limits. The weight limits may define a maximum weight permitted between axles of a vehicle when travelling on the highway. In other embodiments, the actuation of telescopic actuator may be in response to an input by a user on user input device 38. User input device 38 may be located in tractor unit 20 and may be readily accessible to a driver of truck 10.

FIG. 4 depicts a back view of trailer 14 of truck 10. The door of trailer 14 located at the back of the trailer has been omitted to depict the interior of trailer 14. As depicted in FIG. 4, trailer 14 may define an interior space. In some embodiments, truck 10 may be a dump truck and trailer 14 may be loaded with construction materials (e.g. sand, gravel). The interior space may be defined by trailer floor 54 and pivotable doors 66, 68.

Trailer 14 may be open-topped to allow material to be filled in the interior space. In some embodiments, a tarp may be used during transport to cover the materials loaded in the interior space. Trailer 14 may include an automatic roll-off tarping system. The tarping system may include an actuator and guides to unroll tarp to cover the materials loaded in the interior space of trailer 14. In alternative embodiments, trailer 14 may include a thin flexible retractable roof made of carbon fiber. The retractable roof may be unrolled using an actuator to cover the interior space of trailer 14. Castor wheels may be mounted to a portion of the retractable roof. The retractable roof may be coupled to an actuator to cause movement of the retractable roof. The castor wheels may be fitted within a track to guide the retractable roof to cover and uncover the open top of trailer 14. In some embodiments, solar panels may be integrated within the retractable roof to generate electrical energy.

Trailer 14 may further comprise battery compartment 57 located within the interior space that is defined by at least the floor of the trailer and two walls 56, 58 that each extend along a length of floor 54 (As shown in FIG. 5). Battery compartment 57 may have a generally triangular prism shape. First wall 56 may extend from a first side of floor 54 to intersection 55 between first wall 56 and second wall 58. Second wall 58 may extend from a second side of floor 54 to intersection 55 between first wall 56 and second wall 58. First wall 56 and second wall 58 may be at an angle relative to floor 54 and pivotable doors 66, 68. Intersection 55 may be at a height greater than a height of floor 54.

In some embodiments, battery compartment 57 may have one or more apertures to provide access to battery compartment 57 and allow insertion/removal of battery modules. In some embodiments, hydrogen fuel cells may be insertable in the one or more apertures. Battery compartment 57 may define aperture 53 between floor 54, first wall 56 and second wall 58. An individual may be able to insert or remove battery modules through aperture 53 of battery compartment 57 by standing outside trailer 14 at a rear of trailer 14. Aperture 53 may be covered with a lid by a user for example when material is loaded into trailer 14. The lid may be bolted to battery compartment 57.

In some embodiments, a forced convection device such as a battery cooling fan (not shown) may be defined within battery compartment 57 for cooling one or more battery modules 64 within battery compartment. The force convention device may be configured to blow air along a length of battery compartment 57 toward aperture 53 to cool one or more battery modules 64 when in use. In an embodiment, one or more battery modules 64 may be free of liquid cooling system(s) and solely reply on the battery cooling fan.

In some embodiments, material may be loaded into trailer 14 on top of battery compartment 57. The crevice defined between wall 56 and pivotable door 66 and the crevice defined between wall 58 and pivotable door 68 may be filled with material. Battery compartment 57 may be completely enclosed during filling (i.e. apertures lidded) to prevent material from entering battery compartment 57.

As depicted in FIG. 4, pivotable doors 66, 68 may each be mechanically connected at one end to a rim of the roof. In some embodiments, the mechanical connection is a rigid connection. The other end of each of pivotable doors 66, 68 may be latched to respective striker plates of trailer 14. Pivotable doors 66, 68 may each include a latch to engage respective striker plates. When pivotable doors 66, 68 are latched to the striker plates of trailer 14, pivotable doors 66, 68 may define side walls of trailer 14 and a first side of floor 54 and a second side of floor 54. Pivotable doors 66, 68 may be latched to the striker plates of trailer 14 when material is being loaded in trailer 14 or truck 10 is in transport. Pivotable doors 66, 68 may be unlatched from the striker plates of trailer 14 using a push/pull lever located in trailer unit 20 of truck 10. In some embodiments, pivotable door 66 may be unlatched using a different lever than a lever used for unlatching pivotable door 68.

To unload material from trailer 14, pivotable doors 66 and 68 may be unlatched. Material in trailer 14 may push against pivotable doors 66 and 68 to unload the material. Due to the angled surface of walls 56 and 58, material may be guided and forced (i.e. gravity) toward pivotable doors 66 and 68. It should be understood that the angle of walls 56 and 58 relative to floor 54 may be selected to ensure that the material is guided toward pivotable doors 66 and 68 and offloaded from trailer 14 when doors 66 and 68 are unlatched. In an embodiment, walls 56 and 58 may be disposed at an angle of 0 to 45 degrees relative to the floor 54 based on a cross sectional view of walls 56, 58 and floor 54. In an embodiment walls 56 and 58 may be disposed at a 45 degree angle with respect to the floor 54 based on a cross sectional view of walls 56, 58 and floor 54. The pushing force of material on pivotable doors 66 and 68 may cause pivotable doors 66 and 68 to at least partially open, permitting at least some material to be offloaded. In some embodiments, truck 10 may have actuators coupled to pivotable doors 66 and 68 to ensure that doors 66 and 68 remain open once the doors at least partially open from the pushing force from the material. Pivotable doors 66 and 68 may be made of a lightweight material with high strength such as carbon fiber to allow the pivotable doors 66 and 68 to be opened by the force from the material. After the material has been offloaded from trailer 14, pivotable doors 66 and 68 may be re-latched to respective striker plates manually or automatically.

Conventional dump trucks often use hydraulic dumping systems that may include one or more hydraulic pistons to lift an end of a trailer to unload material stored within the trailer. These hydraulic dumping systems can be quite heavy and can use a large amount of energy to operate. The use of pivotable doors 66 and 68 in truck 10 rather than a hydraulic dump system may reduce the weight of truck 10 and the power consumption of truck 10. This reduction in weight may reduce carbon dioxide and other greenhouse gas emissions into the atmosphere. This reduction in weight could also permit truck 10 to carry a larger load in comparison to a conventional truck without using more energy than the conventional truck.

FIG. 5 shows a perspective view of a portion of an alternative embodiment of trailer 14 that has two pivotable doors on each side of trailer 14. In reference to FIG. 4, the latching mechanism described above is similar to the latching of pivotable doors 63, 65, 67 and 69.

As depicted in FIG. 4, one or more battery modules 64 inserted in battery compartment 57 may be connected to electric motors 60 and 62 to supply power to motors 60 and 62 and to drive truck 10. Floor 54 of trailer 14 may have one or more apertures to allow electrical wiring to be fitted through the apertures to permit power to be supplied from the one or more battery modules 64 to electric motors 60 and 62. Controllers 72 and 74 may be connected between the one or more battery modules 64 and motors 60 and 62 to regulate an amount of power supplied to electric motors 60 and 62, respectively. In some embodiments, electric motors 60 and 62 may act as electrical generators during braking to recover energy that may be stored in battery modules 34 or another energy storage.

In some embodiments, truck 10 may also include a diesel generator or a natural gas generator that provides electrical power to electric motors 60 and 62. The diesel generator or the natural gas generator may be part of tractor unit 20 of truck 10.

In some embodiments, solar panels may be mounted to pivotable doors 66 and 68 or may form part of pivotable doors 66 and 68 to provide electrical power to electric motors 60 and 62. In some embodiments, solar panels may be mounted to the retractable roof or form part of the retractable roof to provide electrical power to electric motors 60 and 62.

Truck 10 relying on battery modules and/or hydrogen fuel cells and/or generators and/or solar panels to power electric motors 60 and 62 to drive truck 10 may emit little or no carbon dioxide and other greenhouse gases. Using electric trucks 10 rather than diesel powered dump trucks for construction projects may reduce the carbon footprint of these projects.

Figure 6:
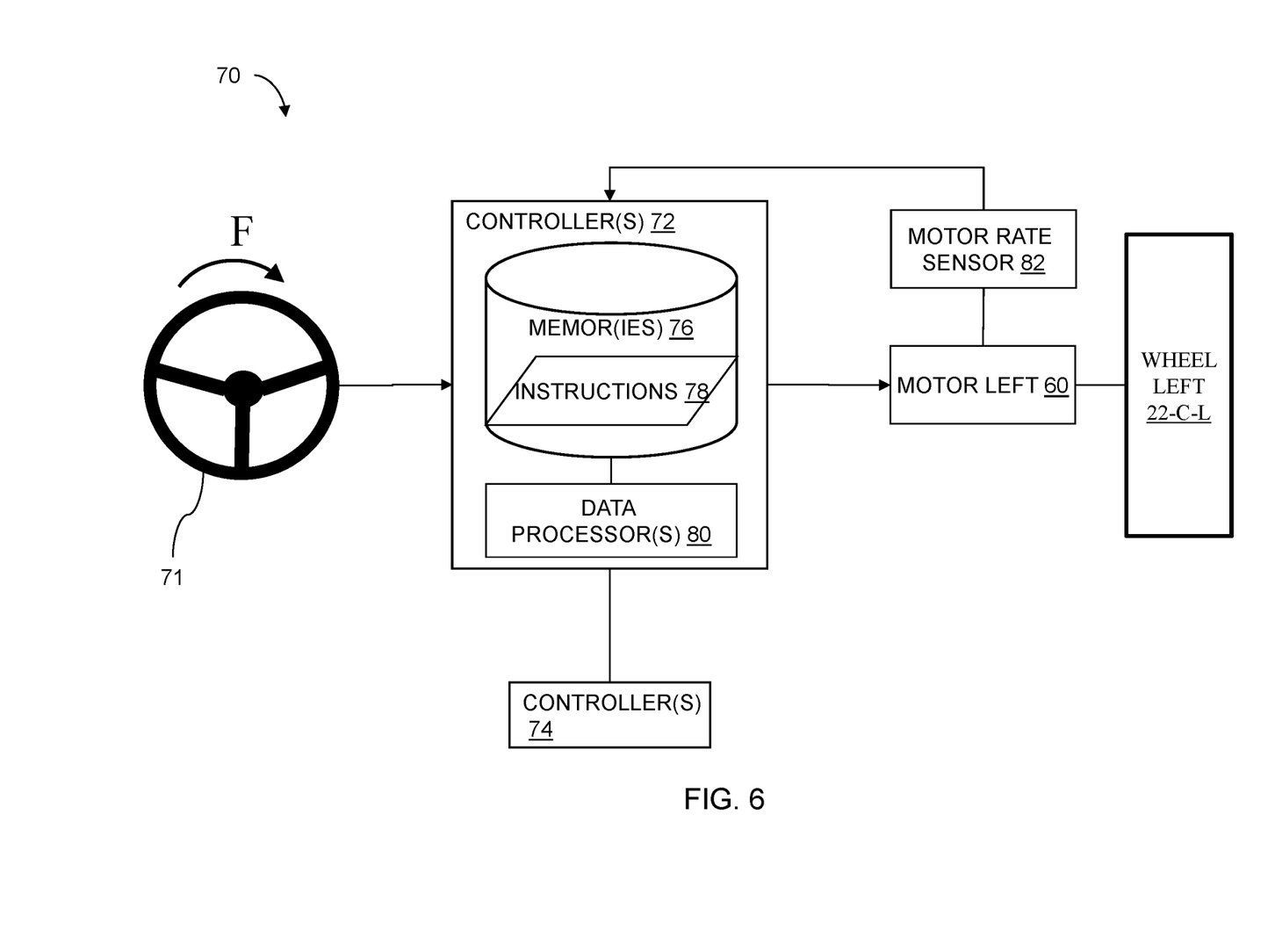
FIG. 6 shows a system for regulating an amount of power supplied to an electric motor coupled to a wheel.

Truck 10 may be configured to perform differential steering using differential steering system 70 that may be employed at each wheel powered by an electric motor. FIG. 6 depicts system 70 for regulating an amount of power supplied to electric motor 60 thereby controlling a torque provided to wheel 22-C-L of coaxial wheel pair 22-C. System 70 may include controllers 72 and motor rate sensor 82. Motor rate sensor 82 may be configured to detect a rotation speed and a direction of an output drive of motor 60.

Controller 72 may be configured to receive a steering signal indicative of a position of steering wheel 71 on a substantially continuous basis or intermittently. Controller 80 may be configured to receive data indicative of a rotation speed and a direction of the output drive of motor 60 from motor rate sensor 80. In some embodiments, controller 72 may be communicatively coupled to controller 74 that controls power supplied to wheel 22-C-R of coaxial wheel pair 22-C.

In some embodiments, controller 72 may also be communicatively coupled to controllers that control power supplied to other coaxial wheel pairs. For example, controller 72 may be communicatively coupled to a controller that controls an amount of power supplied to a wheel of coaxial wheel pair 22-B.

Controller 74 may include one or more data processors 80 (referred hereinafter in the singular) and one or more computer-readable memories 76 (referred hereinafter in the singular) storing machine-readable instructions 78 executable by data processor 80 and configured to cause data processor 80 to generate one or more outputs for causing the execution of steps of the methods described herein.

Data processor 80 may include any suitable device(s) configured to cause a series of steps to be performed by controller 74 so as to implement a computer-implemented process such that instructions 78, when executed by controller 72 or other programmable apparatus, may cause the functions/acts specified in the methods described herein to be executed. Data processor 80 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 76 may include any suitable machine-readable storage medium. Memory 76 may include non-transitory computer readable storage medium such as, for example, but not limited to, an electronic, magnetic, optical, electromagnetic, infrared, or semiconductor system, apparatus, or device, or any suitable combination of the foregoing. Memory 76 may include a suitable combination of any type of computer memory that is located either internally or externally to controller 72. Memory 76 may include any storage means (e.g. devices) suitable for retrievably storing machine-readable instructions 78 executable by data processor 80.

Various aspects of the present disclosure may be embodied as systems, devices, methods and/or computer program products. Accordingly, aspects of the present disclosure may take the form of an entirely hardware embodiment, an entirely software embodiment or an embodiment combining software and hardware aspects. Furthermore, aspects of the present disclosure may take the form of a computer program product embodied in one or more non-transitory computer readable medium (e.g., memory 76) having computer readable program code (e.g., instructions 78) embodied thereon. Computer program code for carrying out operations for aspects of the present disclosure in accordance with instructions 78 may be written in any combination of one or more programming languages. Such program code may be executed entirely or in part by controller 72 or other data processing device(s). It is understood that, based on the present disclosure, one skilled in the relevant arts could readily write computer program code for implementing the methods disclosed herein.

Based on the steering signal and the data indicative of a rotation speed and a direction of the output drive of motor 60, controller 72 may be configured to determine an amount of power to be supplied to motor 60 to provide the required torque to wheel 22-C-L to steer truck 10. Although it is not depicted, it should be understood that a system identical to system 70 may be used to control wheel 22-C-R. A different amount of torque may be applied to wheels 22-C-L and 22-C-R based on a position of steering wheel 71 to provide differential steering of truck 10. For example, when turning truck 10 left, controller 72 may be configured to provide a torque to wheel 22-C-L that is less than an amount of torque provided wheel 22-C-R. Controller 72 may be communicatively coupled to controller 74 to receive/transmit data indicative of an amount of power supplied to motors 60, 62. The differential system 70 employed in truck 10 may improve the manoeuverability of truck 10.

Although system 70 has only been described as providing differential steering, it should be understood that system 70 could also be used to provide other types of steering such as wheel pivot steering or crab steering.

Figure 7:
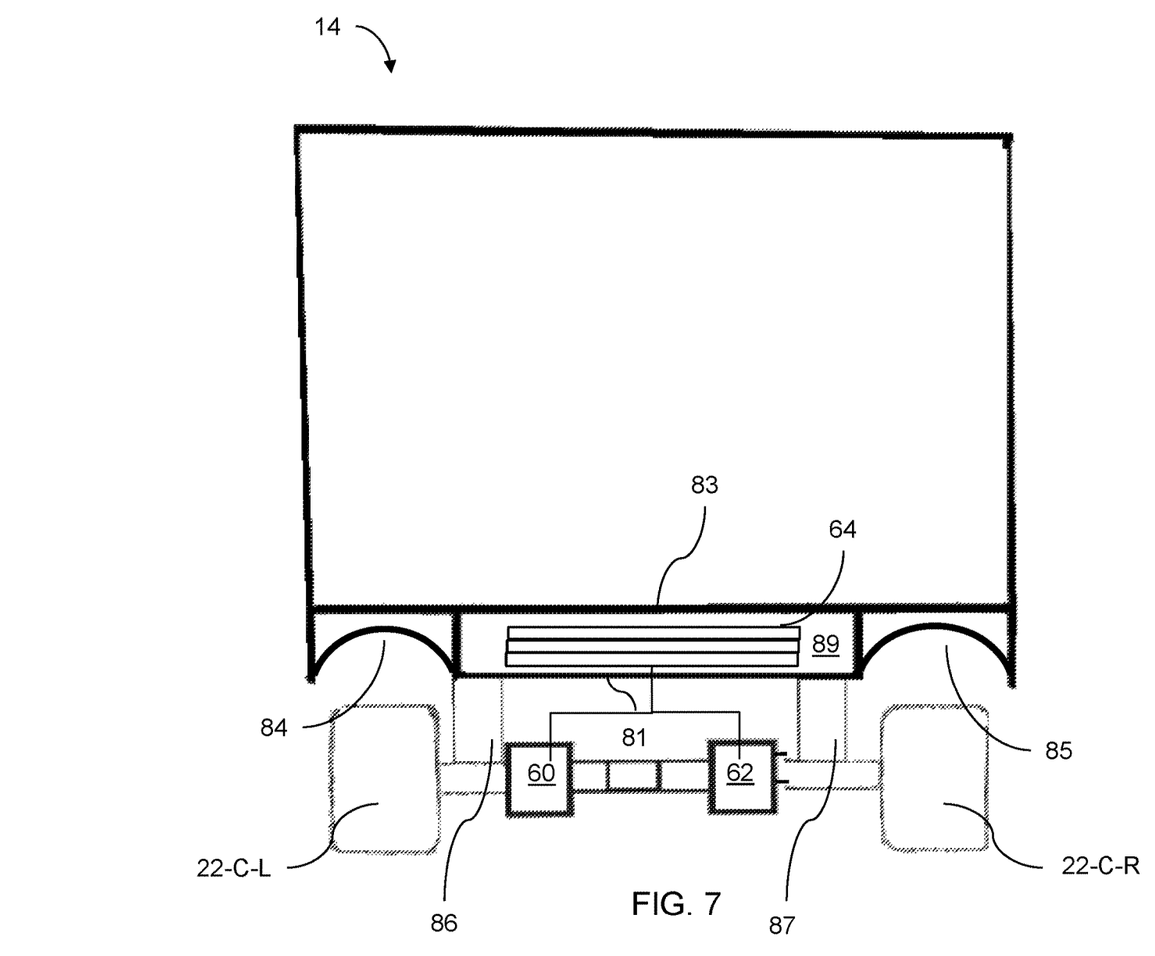
FIG. 7 shows a rear view of a trailer a truck according to a second embodiment of the invention.

FIG. 7 depicts a back view of trailer 14 of truck 10 according to another embodiment of the invention. The door of trailer 14 located at the back of the trailer has been omitted to depict the interior of trailer 14. Battery compartment 89 may be defined between floor 81 of trailer 14 and loading floor 83 of trailer 14. Battery compartment 89 may be of sufficient size to accommodate one or more battery modules 64 and/or hydrogen fuel cells to power electric motors 60 and 62.

In the embodiment depicted in FIG. 7, truck 10 may not be a dump truck. Instead, truck 10 may be a truck used to carry freight. Freight may be loaded in truck 10 and unloaded from truck 10 at a loading dock in an industrial building or warehouse for example. Truck 10 may include air bags 86 and 87 that may be inflated or deflated to raise or lower truck 10. Truck 10 may be lowered or raised to permit freight to be easily removed from trailer 14 at a loading dock for example. Truck 10 may have wheel wells 84 and 85 that are of a sufficient size to allow the lowering or raising of truck 10.

Figure 8:
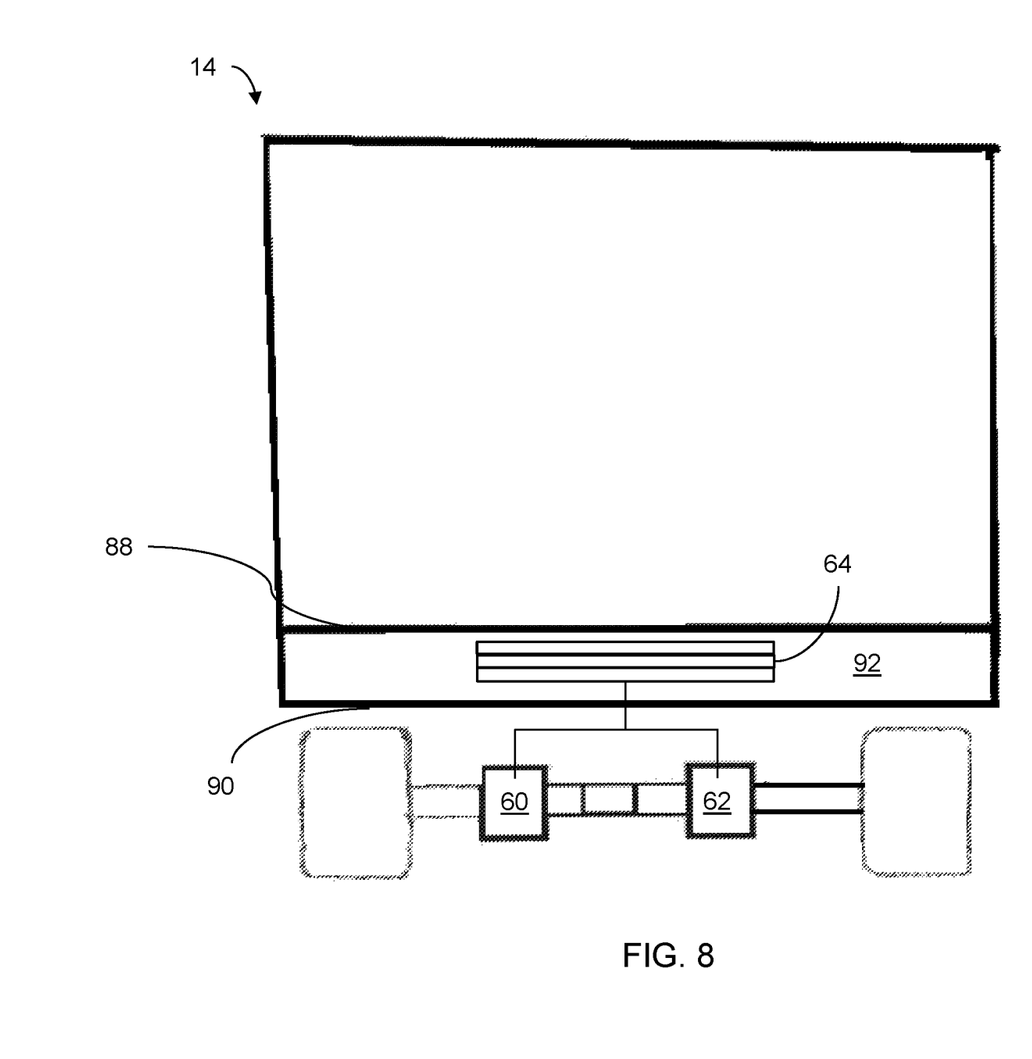
FIG. 8 shows a rear view of a trailer a truck according to a third embodiment of the invention.

FIG. 8 depicts a rear view of trailer 14 of truck 10 according to another embodiment of the invention. The door of trailer 14 located at the back of the trailer has been omitted to depict the interior of trailer 14. Battery compartment 92 may be defined between floor 90 of trailer 14 and loading floor 88 of trailer 14. Material may be loaded on loading floor 88 of trailer 14. An individual may insert or remove one or more battery modules 64 and/or one or more hydrogen fuel cells through an aperture that is exposed when the door located at the back of trailer 14 is opened. An individual may insert or remove battery modules into battery compartment 92 by standing outside trailer 14 at a rear of trailer 14.

In reference to FIGS. 4-8, although trailer 14 is the only trailer depicted, it should be understood that the elements and systems included in trailer 14 may be included in trailer 16 and/or 18 for example. In a case that truck 10 has a different number of trailers than that depicted in FIG. 1, some or all of the trailers of the truck may include the elements included in trailer 14.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A system comprising:
   telescoping members mechanically coupled to a back end of a first trailer of a truck and a front end of a second trailer of the truck, the telescoping members defining a desired distance between the back end of the first trailer and the front end of the second trailer;
   an actuator coupled to the telescopic members, the actuator configured to maintain the desired distance between the coupled back end of the first trailer and the front end of the second trailer;
   one or more data processors; and
   non-transitory machine-readable memory storing instructions executable by the one or more data processors and configured to cause the one or more data processors to:
   receive data indicative of a geographical location of the truck and data indicative of a location having a weight limit;

determine, using the data indicative of the geographical location of the truck and the location having the weight limit, an initiation time at which to initiate actuation of the actuator for increasing or decreasing the length of the telescoping members to position the back end of the first trailer and the front end of the second trailer at the desired distance between the back end of the first trailer and the front end of the second trailer;

determine, using the data indicative of the geographical location of the truck and the data indicative of the location having the weight limit, the desired distance based on the weight limit;

automatically initiate actuation of the actuator at the initiation time to increase or decrease the length of the telescoping members to position the back end of the first trailer and the front end of the second trailer at the desired distance while the first and second trailers of the truck are moving toward the location having the weight limit; and when the back end of the first trailer and the front end of the second trailer are at the desired distance, actuate the actuator to maintain the desired distance by preventing relative movement between the telescoping members while the first and second trailers of the truck are moving toward and at the location having the weight limit.

2. The system of claim 1, wherein the instructions are configured to receive the data indicative of the geographical location of the truck from a global positioning system receiver within the truck.

3. The system of claim 1, wherein automatically initiating actuation of the actuator to allow movement of an inner section of the telescoping members relative to an outer section of the telescoping members.

4. The system of claim 3, wherein automatically initiating actuation of the actuator at the initiation time includes using a hydraulic system for providing the movement of the inner section relative to the outer section.

5. The system of claim 3, wherein, when the geographical location of the truck is proximate the location having the weight limit, wherein the location is a bridge, automatically initiating actuation of the actuator includes outward movement of the inner section relative to the outer section to increase a distance between the back end of the first trailer and the front end of the second trailer to the desired distance.

6. The system of claim 5, wherein the outward movement of the inner section relative to the outer section causes the truck to be within the weight limit of the bridge.

7. The system of claim 3, wherein, when the geographical location of the truck is moving away from the bridge, automatically initiating actuation of the actuator includes inward movement of the inner section relative to the outer section to reduce the a distance between the back end of the first trailer and the front end of the second trailer to the desired distance.

* * * * *